United States Patent
Shibuya et al.

(10) Patent No.: US 9,615,688 B2
(45) Date of Patent: Apr. 11, 2017

(54) STEAM GENERATOR AND HEATING COOKER INCLUDING STEAM GENERATOR

(71) Applicant: Panasonic Intellectual Property Management Co., Ltd., Osaka-shi, Osaka (JP)

(72) Inventors: Masaki Shibuya, Osaka (JP); Hiroshi Kawai, Shiga (JP); Yuji Hayakawa, Shiga (JP); Kuniaki Abe, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 156 days.

(21) Appl. No.: 14/415,487

(22) PCT Filed: Jul. 10, 2013

(86) PCT No.: PCT/JP2013/004270
§ 371 (c)(1),
(2) Date: Jan. 16, 2015

(87) PCT Pub. No.: WO2014/013700
PCT Pub. Date: Jan. 23, 2014

(65) Prior Publication Data
US 2015/0173552 A1 Jun. 25, 2015

(30) Foreign Application Priority Data

Jul. 20, 2012 (JP) ................................. 2012-161172

(51) Int. Cl.
*H05B 6/80* (2006.01)
*H05B 6/64* (2006.01)
(Continued)

(52) U.S. Cl.
CPC ............. *A47J 27/04* (2013.01); *A47J 36/027* (2013.01); *F22B 1/281* (2013.01); *F22B 1/285* (2013.01);
(Continued)

(58) Field of Classification Search
CPC .... A47J 27/04; A47J 36/027; A47J 2027/043; F24C 15/327; F22B 1/285; F22B 1/281; H05B 6/804
(Continued)

(56) References Cited

U.S. PATENT DOCUMENTS

2001/0022300 A1* 9/2001 Ushijima ................ F22B 1/281
219/688
2008/0148962 A1* 6/2008 Beausse ............... H05B 6/6479
99/339
(Continued)

FOREIGN PATENT DOCUMENTS

| CN | 102132101 A | 7/2011 |
|---|---|---|
| CN | 102132103 A | 7/2011 |

(Continued)

OTHER PUBLICATIONS

Office Action and Search Report, and English translation thereof, for corresponding Chinese Application No. 201380037233.2 dated Oct. 26, 2015, 10 pages.
(Continued)

*Primary Examiner* — Quang Van
(74) *Attorney, Agent, or Firm* — Brinks Gilson & Lione

(57) ABSTRACT

A steam generator includes a water storage chamber that stores water and at least one heating portion that heats the water in the water storage chamber to generate steam. A water supply device supplies water into the water storage chamber. A plurality of fins are provided in the water storage chamber. The water storage chamber has a steam spout port
(Continued)

from which the steam generated by the heating portion spouts. The plurality of fins extend along a steam-generating direction under the steam spout port, and are separated from each other and cross the heating portion. The heating portion may be above and below a water surface that emerges in the water storage chamber during heating.

4 Claims, 9 Drawing Sheets

(51) Int. Cl.
    *A47J 27/00*     (2006.01)
    *A21B 1/00*     (2006.01)
    *F22B 1/28*     (2006.01)
    *A47J 27/04*     (2006.01)
    *F24C 15/32*     (2006.01)
    *A47J 36/02*     (2006.01)

(52) U.S. Cl.
    CPC ........... *F24C 15/327* (2013.01); *H05B 6/804* (2013.01); *A47J 2027/043* (2013.01)

(58) Field of Classification Search
    USPC ....... 219/682, 679, 687, 688, 710, 731, 756, 219/395, 398, 396, 401, 520; 99/324; 126/20, 273 R; 392/386
    See application file for complete search history.

(56) References Cited

U.S. PATENT DOCUMENTS

| | | |
|---|---|---|
| 2010/0230397 A1 | 9/2010 | Ohashi et al. |
| 2011/0095013 A1 | 4/2011 | Utsumi et al. |
| 2011/0139014 A1 | 6/2011 | Nishiura et al. |
| 2013/0042768 A1 | 2/2013 | Nishijima et al. |

FOREIGN PATENT DOCUMENTS

| | | |
|---|---|---|
| EP | 1 486 725 A1 | 12/2004 |
| EP | 2 314 925 A1 | 4/2011 |
| JP | S55-61201 U | 4/1980 |
| JP | S56-130505 A | 10/1981 |
| JP | 2006-38315 A | 2/2006 |
| JP | 2006-284131 A | 10/2006 |
| JP | 2008-32304 A | 2/2008 |
| JP | 2008-164284 A | 7/2008 |
| JP | 2009-41819 A | 2/2009 |
| WO | WO 2011/136252 A1 | 11/2011 |
| WO | WO 2012/049517 A2 | 4/2012 |

OTHER PUBLICATIONS

International Search Report, and English language translation thereof, in corresponding International Application No. PCT/JP2013/004270, dated Aug. 27, 2013, 3 pages.
International Preliminary Report on Patentability, and English language translation thereof, in corresponding International Application No. PCT/JP2013/004270, dated Aug. 21, 2014, 13 pages.
Extended European Search Report in European Application No. 13820682.6, dated Jul. 20, 2015, 6 pages.

* cited by examiner

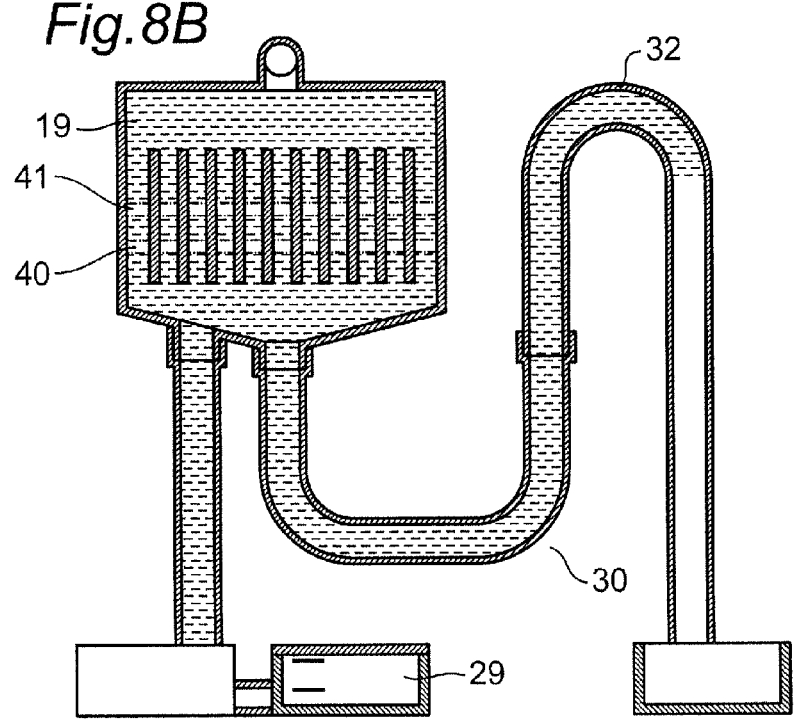
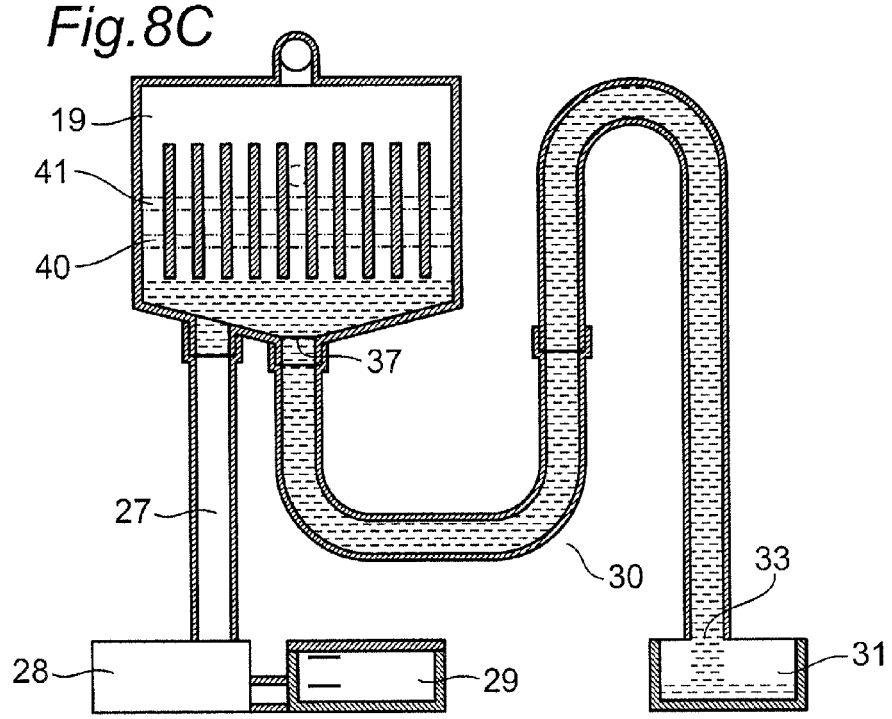

STEAM GENERATOR AND HEATING COOKER INCLUDING STEAM GENERATOR

This application is a 371 application of PCT/JP2013/004270 having an international filing date of Jul. 10, 2013, which claims priority to JP2012-161172 filed Jul. 20, 2012, the entire contents of which are incorporated herein by reference.

TECHNICAL FIELD

The present invention relates to a steam generator which heats water to generate steam and a heating cooker including the steam generator.

BACKGROUND ART

Conventionally, some steam generators have heat dissipation fins which define a labyrinthine passage in the steam generating chamber (for example, see Patent Literature 1). Providing the heat dissipation fins in this way can prevent boiling water from running-up from a bottom of the steam generating chamber to reach a steam spout port. The fins of the steam generator disclosed in Patent Literature 1 have a flat plate-shaped portion provided as extending horizontally for preventing running-up by the boiling water.

PRIOR ART

Patent Literature

Patent Literature 1: JP 2008-164284 A

SUMMARY OF THE INVENTION

Issues to be Resolved by the Invention

The above conventional configuration, however, cannot prevent the boiling water from running up reliably. In recent years, it is desired to prevent the boiling water from running up more reliably.

The present invention is made to overcome the aforementioned issues in a conventional steam generator and aims at providing a steam generator which can prevent boiling water from ejecting from a steam spout port, by inhibiting running-up by the boiling water in the steam generating chamber.

Means for Resolving the Issues

A steam generator includes: a water storage chamber which stores water; at least one heating portion which heats water in the water storage chamber to generate steam; a water supply device which supplies water into the water storage chamber; and a plurality of fins provided in the water storage chamber, wherein the water storage chamber has a steam spout port from which the steam generated by the heating portion spouts, wherein the plurality of fins extend along a steam-generating direction under the steam spout port, being separated with each other and crossing the heating portion.

According to such a steam generator, the plurality of fins extend along a steam-generating direction under the steam spout port, being separated with each other and crossing the heating portion. Thus, the fins can transmit heat in a vicinity of the heating portion, with a high temperature in particular, to the inside of the water in the water storage chamber, to which heat is less likely to be transmitted, and also the fins can increase a contact area between the water storage chamber and the water, thereby transmitting the heat from the heating portion to the water efficiently. Therefore, temperature of a contact portion between the water storage chamber and the water decreases, and thus large bubbles which may occur at high temperature are less likely to be generated. Therefore, running-up by boiling water due to burst of the large bubbles which have risen to the water surface can be reduced, and thus the boiling water can be prevented from ejecting from the steam spout port. Also, the large bubbles are less likely to be generated, thereby reducing burst sound of the bubbles.

Also, a steam generator includes: a water storage chamber which stores water; a heating portion which heats water in the water storage chamber, to generate steam; and a water supply device which supplies water into the water storage chamber, wherein the water storage chamber is provided with a steam spout port from which the steam generated by the heating portion spouts, and wherein the at least one heating portion is provided each of above and under a water surface which emerges in the water storage chamber during heating.

According to such a steam generator, even when the bubbles generated during boiling burst at the water surface to run up, the heating portion arranged above the water surface heats the bubbles and changes them into steam, thereby preventing the boiling water from ejecting from the steam spout port.

Effects of the Invention

The steam generator according to the present invention can prevent the boiling water from ejecting from the steam spout port by inhibiting running-up by the boiling water in the steam generating chamber.

BRIEF DESCRIPTION OF THE DRAWINGS

FIG. 8B is a cross-sectional view illustrating the second operation of the steam generator according to the first embodiment of the present invention during the water discharge process for the water supply passage.

FIG. 8C is a cross-sectional view illustrating the third operation of the steam generator according to the first embodiment of the present invention during the water discharge process for the water supply passage.

DETAILED DESCRIPTION OF THE PREFERRED EMBODIMENTS

Figure 1:
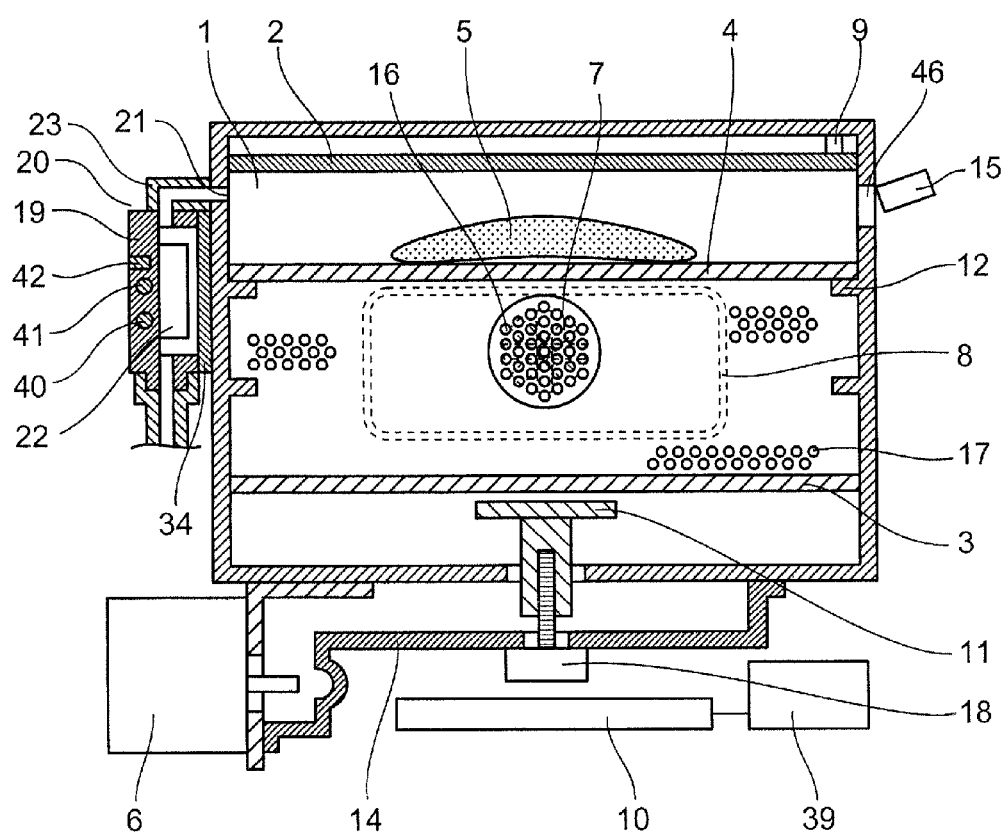
FIG. 1 is a front cross-sectional view illustrating a heating cooker including a steam generator according to a first embodiment of the present invention.

A first invention is a steam generator including: a water storage chamber which stores water; at least one heating portion which heats water in the water storage chamber to generate steam; a water supply device which supplies water into the water storage chamber; and a plurality of fins provided in the water storage chamber, wherein the water storage chamber has a steam spout port from which the steam generated by the heating portion spouts, and wherein the plurality of fins extend along a steam-generating direction under the steam spout port, being separated with each other and crossing the heating portion. Thus, the fins can transmit heat in a vicinity of the heating portion, with a high temperature in particular, to the inside of the water in the water storage chamber, to which heat is less likely to be transmitted, and also the fins can increase a contact area between the water storage chamber and the water, thereby transmitting the heat from the heating portion to the water efficiently. Thus, temperature of a contact portion between the water storage chamber and the water decreases, and thus large bubbles which may occur at high temperature are less likely to be generated. Therefore, running-up by boiling water due to burst of the large bubbles which have risen to the water surface can be reduced, and the boiling water can be prevented from ejecting from the steam spout port. Also, the large bubbles are less likely to be generated, thereby reducing burst sound of the babbles. Also, the temperature of the contact portion between the water storage chamber and the water can be decreased, thereby suppressing scale deposition which is likely to occur at higher temperature. Also, the water storage chamber is finely partitioned by the fins, thereby reducing sizes of the bubbles during boiling physically. This can further reduce the large bubble generation. Also, the fins are arranged along the steam-generating direction, thereby leading to unstopping of the steam flow. This can increase steam amount and steam flow rate.

A second invention is the first invention, wherein a cross-sectional area defined by the water storage chamber and the fins in a plane perpendicular to the steam-generating direction is equal to or larger than a cross-sectional area of the steam spout port. This leads to reduction of a cross-sectional area of a steam passage, thereby reducing pressure loss of the steam in the steam passage to suppress steam amount reduction. That is, while suppressing reduction of the steam amount, running-up by the boiling water can be inhibited, the boiling water can be prevented from ejecting from the steam spout port, and the burst sound of the babbles can be reduced.

A third invention is the first or second invention, wherein the fins extend from a first side surface in the water storage chamber, and distal ends of the fins are spaced from a second side surface in the water storage chamber opposite to the first side surface. Thus, water can flow between the fins and the second side surface, thereby increasing the contact area between the water storage chamber and the water. This facilitates water convection, thereby achieving more uniform temperature distribution of the water in the water storage chamber. Thus, large bubble generation can be reduced, thereby inhibiting running-up by the boiling water and thus preventing the boiling water from ejecting from the steam spout port. Also, it is possible to reduce burst sound of the babbles.

A fourth invention is any one of the first invention to the third invention, wherein the at least one heating portion is provided each of above and under a water surface which emerges in the water storage chamber during heating. Thus, even when the bubbles generated during boiling burst at the water surface to run up, the heating portion arranged above the water surface heats the bubbles and changes them into steam, thereby preventing the boiling water from ejecting from the steam spout port.

A fifth invention is a steam generator including: a water storage chamber which stores water; a heating portion which heats water in the water storage chamber to generate steam; and a water supply device which supplies water into the water storage chamber, wherein the water storage chamber has an inner wall provided with a steam spout port from which the steam generated by the heating portion spouts, and wherein the at least one heating portion is provided each of above and under a water surface which emerges in the water storage chamber during heating. Thus, even when the bubbles generated during boiling burst at the water surface to run up, the heating portion arranged above the water surface heats the bubbles and changes them into steam, thereby preventing the boiling water from ejecting from the steam spout port.

A sixth invention is a heating cooker provided with the steam generator any one of the first invention to the fifth invention.

Hereinafter, a first embodiment of the present invention will be described with reference to the accompanying drawings. The present invention is not limited to the first embodiment.

First Embodiment

FIG. 1 is a front cross-sectional view illustrating a heating cooker including a steam generator according to the first embodiment of the present invention.

In FIG. 1, the heating cooker according to the first embodiment has a heating chamber 1 which is formed from an aluminum-plated steel plate coated with fluorine, and within which a food 5 as an object to be heated is housed. The heating chamber 1 is provided with a mounting plate 4 which mounts the food 5 thereon and can be taken into or out of the heating chamber 1, rails 12 which support the mounting plate 4, a mounting table 3 formed with crystallized glass which is fixed to the heating chamber 1 and mounts the food 5 thereon, and heating chamber heaters 2 provided near a ceiling of the heating chamber 1 such that three heaters are arranged in parallel. A peak value of wavelength of the heating chamber heater 2 located at the center of the three heating chamber heaters 2 is set lower than a peak value of the other two heating chamber heaters 2.

A wall surface forming the heat chamber 1 is grounded by electrical connection with an earth cable (not illustrated), and the rails 12 which are formed integrally with the heating chamber 1 are also grounded.

While there has been described an example where the wall surface forming the heat chamber 1 according to the first embodiment is applied with a fluorine coating which can be easy to wipe off dirt, a porcelain enamel coating or other heat-resistant coatings can also be applied. Further, while there has been described an example where the aluminum-plated steel plate is used as a material of the heating chamber 1, other metallic materials such as a stainless steel material can also be used.

The mounting plate 4 is formed by an aluminum-plated steel plate, and is formed to have a concavo-convex shape with press working to make oil and fat contents from the food 5 flow out.

A fluorine coating is applied to a surface of the mounting plate 4, and a heat generating element which generates heat by absorbing microwaves is provided on a rear surface of the mounting plate 4. Accordingly, by providing the heat generating element on the rear surface of the mounting plate 4, the food 5 can be heated from both sides with combination of the heating chamber heater 2 located above the food 5 and the heat generating element on the rear surface of the mounting plate 4. Castings of PPS resin material are provided at the connecting portions between the mounting plate 4 and the rails 12 in order to insulate from the heating chamber 1.

In the first embodiment, while there has been described an example where the surface of the mounting plate 4 is applied with the fluorine coating which can be easy to wipe off dirt, a porcelain enamel coating or other heat-resistant coatings can also be applied. Further, while there has been described an example where the aluminum-plated steel plate is used as a material of the heating chamber 1, other metallic materials such as a stainless steel material can also be used.

At the rear side, which is back side of the heating chamber 1, a circulation fan 7 which stirs and circulates air in the heating chamber 1 and a convection heater 8 which is an interior heater heating up air circulating in the heating chamber 1 are provided such that the circulation fan 7 is surrounded by the convection heater 8.

Near the center of the rear side of the heating chamber 1, a plurality of intake vent holes 16 for drawing air from the heating chamber 1 side to the circulation fan 7 side are formed. On the contrary, a plurality of blow vent holes 17 for blowing air from the circulation fan 7 side to the heating chamber 1 side are formed at the specific area in the periphery of the convection heater 8 at the rear side of the heating chamber 1. The forming area of the intake vent holes 16 and the blow vent holes 17 are distinguished each other. Each of vent holes 16, 17 are formed with a number of punch holes.

In the heating cooker according to the first embodiment, as illustrated in FIG. 1, a detection hole 46 is formed at the right side wall (right wall surface) constructing the heating chamber 1, and temperature of the food 5 in the heating chamber 1 is measured by an infrared sensor 15 via the detection hole 46, and inside temperature of the heating chamber 1 is measured by an inside thermistor 9 provided at the upper side of the heating chamber 1.

In the heating cooker according to the first embodiment illustrated in FIG. 1, a magnetron 6 which is a means for generating microwaves is provided under the left wall surface located at the lower side of the heating chamber 1 such that its output terminal is extended horizontally. The magnetron 6 used in the first embodiment has a square shape with a dimension about 80 mm×80 mm when seeing from the left side of FIG. 1. The magnetron 6 is connected to a waveguide 14 having an inside channel with an approximate L shape obtained by bending an aluminum-plated steel plate just below the bottom surface of the heating chamber 1. The output terminal of the magnetron 6 extended horizontally extends into the waveguide 14, therefore, it is configured such that microwaves are propagated through the inside channel of the waveguide 14.

A rotational antenna 11 formed by an aluminum material is provided near the center of the bottom surface of the heating chamber 1, and the rotational antenna 11 is protruded into the heating chamber 1 from the inside of the waveguide 14 located just below the bottom surface of the heating chamber 1 through an opening. The rotational antenna 11 is configured to rotate by a motor 18, and has a function as a means for stirring microwaves emitted from the waveguide 14 into the heating chamber 1.

While the first embodiment is configured such that the magnetron 6, the rotational antenna 11, the motor 18 and the waveguide 14 are provided at the lower side of the heating chamber 1, the present invention is not limited to this configuration. These elements can also be provided at the upper side or at the lateral side of the heating chamber 1, and relating to a direction for installation, each element can be installed in any direction corresponding to the element.

The heating cooker according to the first embodiment having the aforementioned configuration is provided with a steam generator 20. As illustrated in FIG. 1, a water storage chamber 19 which stores water for generating steam in the steam generator 20, a water storage chamber cover 34 which is opposing to the water storage chamber 19 via a packing disposed in an opening of the water storage chamber 19 are provided at the left side of the heating chamber 1 when seeing from the front of the heating cooker. Both the water storage chamber 19 and the water storage chamber cover 34 are formed by aluminum die-casting.

The steam generator 20 according to the first embodiment is provided with a first steam generating heater 40 which extends substantially horizontally near the center in a height direction of the water storage chamber 19, and a second steam generating heater 41 which extends substantially horizontally above the first steam generating heater 40. Both the first steam generating heater 40 and the second steam generating heater 41 are used to heat up water in the water storage chamber 19 so as to generate steam and are casted in aluminum die casts of the water storage chamber 19. The first steam generating heater 40 is a linear sheath heater having an output of 650 W and the second steam generating heater 41 is a linear sheath heater having an output of 350 W.

In the first embodiment, two linear sheath heaters having the different outputs are used as the first steam generating heater 40 and the second steam generating heater 41, which are both heating portions to heat the water in the water storage chamber 19 to generate the steam, their total output being 1000 W (650 W at lower, 350 W at upper). Not limited thereto, more heater(s) having a desired output may be provided depending on a necessary steam amount, etc. For example, it is possible to use heaters having a total output that is not 1000 W, a plurality of heaters each having a same output, three or more heaters, or only one heater. Further, heaters with any kind of shapes other than the straight shape heaters can be used. For example, a heater with a U shape, L shape or the like can be used. Also, an output of an upper heater may be set to be larger than an output of an lower heater.

A steam conduit passage 23 is connected to the top surface of the water storage chamber 19 to be extended in the upper direction. The steam conduit passage 23 is bent in a L shape along the outer surface of the heating chamber 1 after being extended from the water storage chamber 19 in the upper direction, and then connected to an upper portion of the side surface of the heating chamber 1 through a steam spout port 21. The steam conduit passage 23 is formed by a silicon tube having a diameter of 10 mm. Steam is discharged from the steam spout port 21 connected to the steam conduit passage 23 into the heating chamber 1.

A water storage chamber thermistor 42 for measuring temperature in the water storage chamber 19 is arranged above the second steam generating heater 41.

In the steam generator 20 according to the first embodiment, while there has been described an example where both the steam conduit passage 23 which is extended from the top surface of the water storage chamber 19 in the upper direction and the steam spout port 21 are formed in a circular sectional shape, they may have an elliptic sectional shape or an oblong sectional shape. Further, while there has been described an example where only one steam spout port 21 is provided in the upper portion of the side surface of the heating chamber 1, it can also have configuration such that the steam spout port 21 is provided in the top surface or the bottom surface, etc. to supply steam into the heating chamber 1, and not only one but also a plurality of the ports can be provided.

It is preferable that a maximum inner dimension of a hole for the steam spout port 21 is a half or less of wavelength of microwaves. In configuration of the first embodiment, the maximum inner dimension of the hole for the steam spout port 21 is preferably 60 mm or less because the wavelength of microwaves is about 120 mm.

In order to reduce scale adherence, a coating with a material such as fluorine, silicone or the like may be applied to an inner surface of the water storage chamber 19 or an inner surface of the water storage chamber cover 34.

Using a temperature detecting means such as the water storage chamber thermistor 42 can conduct its detection longer and more continuously than using a water level sensor for detecting a water level. This can enhance reliability on the scale.

In the heating cooker according to the first embodiment, a control portion 10 is provided below the waveguide 14. The control portion 10 controls the magnetron 6, the motor 18, the circulation fan 7, the heating chamber heater 2, the first steam generating heater 40, the second steam generating heater 41, the convection heater 8, the inside thermistor 9, the water storage chamber thermistor 42, the infrared sensor 15, the water supply pump 28, an operational display portion 39 or the like, according to the cooking menu selected by a user.

Figure 2:
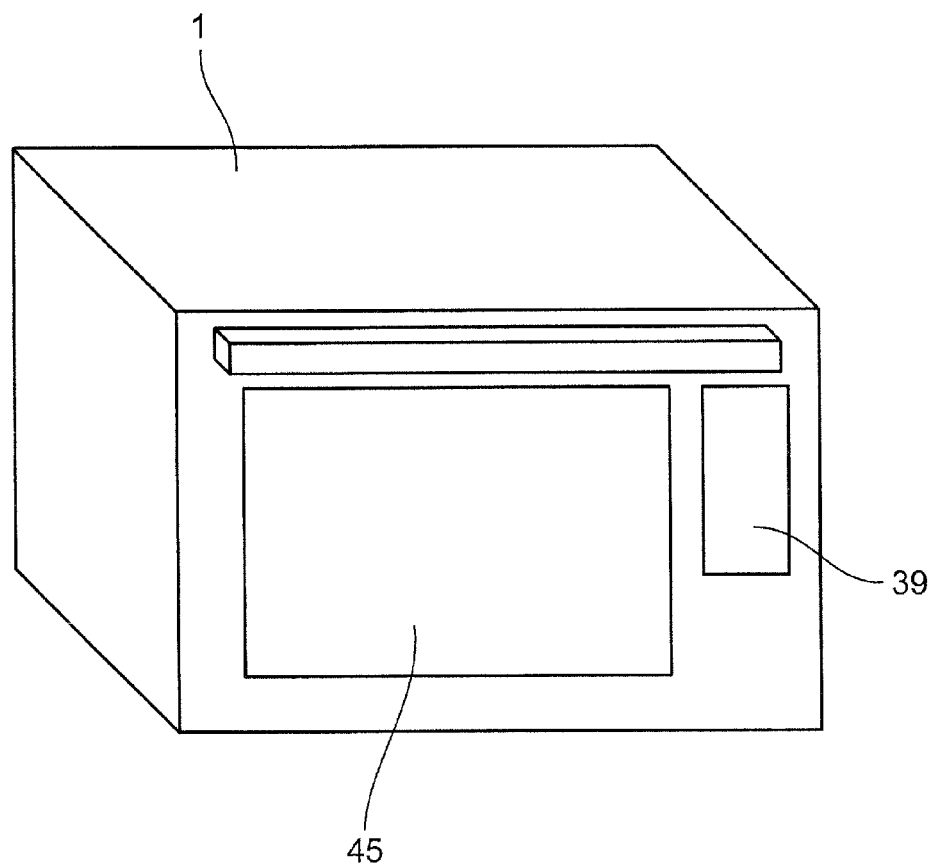
FIG. 2 is a perspective view illustrating an exterior of the steam generator according to the first embodiment of the present invention.

FIG. 2 is a perspective view illustrating an exterior of the heating cooker including the steam generator 20 according to the first embodiment of the present invention.

A door 45 is provided in the front surface of the heating cooker according to the first embodiment 1. The door 45 is configured to be opened toward near side by using the bottom surface side as a fulcrum, and configured such that the food 5 as an object to be heated can be taken into or out of the heating chamber 1. The operational display portion 39 with which a user sets cooking menus or cooking times is provided in the front surface of the heating cooker. Further, the heating cooker according to the first embodiment is provided with a safety switch (not illustrated) for stopping operation of the magnetron 6 or the respective heaters when the door 45 is opened.

Figure 3:
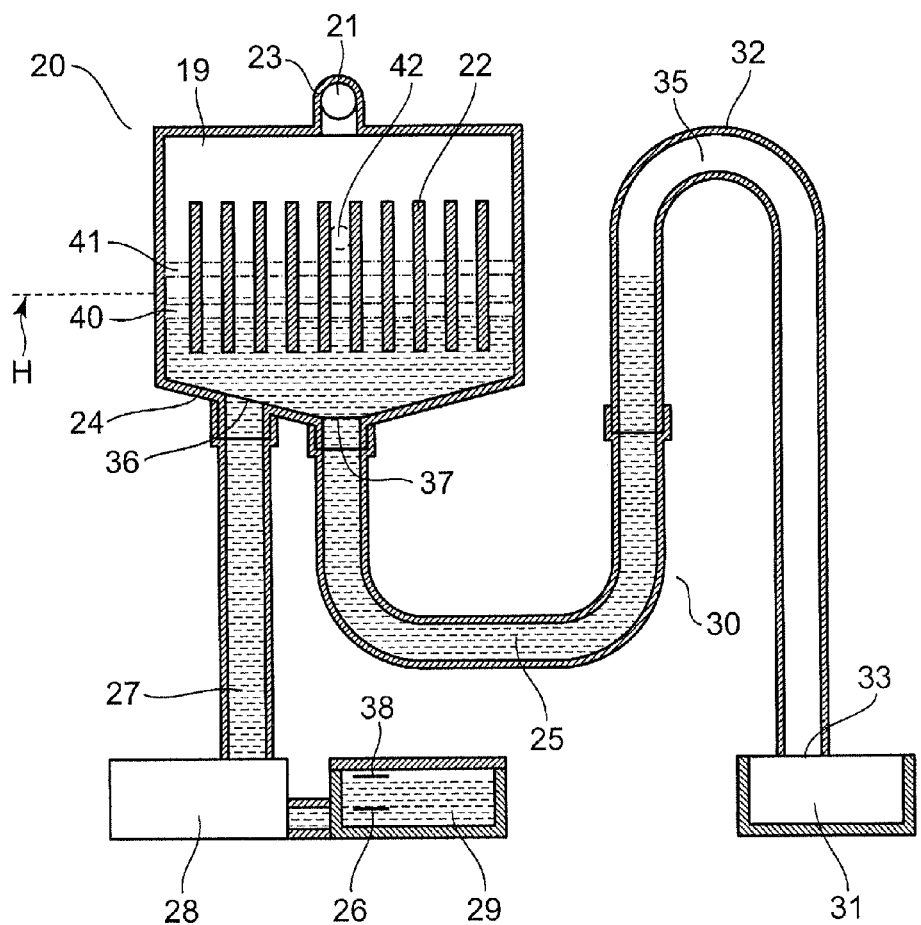
FIG. 3 is a schematic longitudinal cross-sectional view showing the steam generator according to the first embodiment of the present invention.

FIG. 3 is a schematic cross-sectional view showing configuration of the steam generator 20 according to the first embodiment of the present invention.

A plurality of fins 22 are provided near a center of an inner wall of the water storage chamber 19. The fins 22 are arranged in 5 mm horizontal intervals to cross the first steam generating heater 40 and the second steam generating heater 41 at right angles to the heaters. The fins 22 are integral with the water storage chamber 19, and each of the fins 22 has a thicknesses of about 2 mm in the first embodiment. Also, a longitudinal direction of the fins 22 is set to be substantially the same direction as a steam-generating direction. That is, the fins 22 are formed along the steam-generating direction. The "steam-generating direction" means a traveling direction of vapor, which was generated in the water, toward the water surface, or a traveling direction of vapor exited from the water surface. In the first embodiment, the steam generating direction is a direction perpendicular to the water surface in the water storage chamber 19 or a vertical direction in the water storage chamber 19.

Thicknesses, lengths and intervals of the fins 22 may be set based on outputs or shapes of the first steam generating heater 40 and the second steam generating heater 41, for example.

The bottom surface in the inner surface of the water storage chamber 19 is configured to have a sloping surface 24 with a sloping angle of about 5 degrees relative to the horizontal plane, whose center portion is located at the lowest end. Thus, the bottom surface of the water storage chamber 19 is formed in a so called funnel shape, and a discharge port 37 is provided at the lowest end, which is the center portion. A water supply port 36 which supplies water to the water storage chamber 19 is formed in the sloping surface 24 of the water storage chamber 19. The water supply port 36 is placed at left side of the discharge port 37 in FIG. 3. The water supply port 36 and the discharge port 37 are formed in the different position of the bottom surface of the water storage chamber 19.

While the sloping angle of the sloping surface 24 according to the first embodiment is set about 5 degrees relative to horizontal plane, the sloping angle can be determined according to the required water flow in the specification of the heating cooker because water flow is different according to a shape of the water discharge passage 30, amount of water flow supplied after water discharge or the like.

In FIG. 3, one end of a translucent water supply passage 27 formed with a silicone material, which is an elastic body, with an inner diameter of 6 mm is connected to an upstream side which is located below the water supply port 36. The other end of the water supply passage 27 is connected to the water supply tank 29 via a water supply pump 28, which is a water supply device. Thus, the water supply pump 28 is provided as the water supply device which supplies water into the water storage chamber via the water supply passage 27 and the water supply port 36 arranged in the water storage chamber 19.

On the contrary, a water discharge passage 30 in which a first water discharge passage 25 and a second water discharge passage 35 are connected consecutively is provided in the downstream side, which means below the discharge port 37. The first water supply passage 25 is translucent and formed with a silicone material which is an elastic body, and has a pipe like shape with an inner diameter of 6 mm. The first water discharge passage 25 is connected to the discharge port 37 without using another part such as a tube. As illustrated in FIG. 3, the first water discharge passage 25 is extended downward (in approximately vertical direction) from the discharge port 37, and bent toward approximately horizontal direction at a predetermined length from the discharge port 37, then bent toward upward (in approximately vertical direction) at a further predetermined length. Thus, the first water discharge passage 25 has so called a U shape to be convex downward.

While there has been described an example where a silicone material is used as the material of the first water discharge passage 25 according to the first embodiment, it can also use a material such as fluorine, polypropylene, polyethylene or the like. A metallic pipe can be used for the first water discharge passage 25 with applying a coating with a material such as fluorine, silicone or the like to at least an inner surface of the first water discharge passage 25.

The second water discharge passage 35, which is formed by bending a copper pipe with an inner diameter of 6 mm, is connected to a downstream side of the first water discharge passage 25 without using another part such as a tube. The second water supply passage 35 is extended upward from the connecting portion with the first water discharge passage 25 and further extended beyond the horizontally same level of the first steam generating heater 40 and the second steam generating heater 41. The second water discharge passage 35 is bent with 180 degrees at a water discharge passage upmost point 32, as an apex of a U shape, which is located about at the same level as an upmost point of the top surface in the inner surface of the water storage chamber 19. The second water discharge passage 35 located at downstream side of the water discharge passage upmost point 32 extends vertically downward. Thus, the second water discharge passage 35 has so called an inverted U shape to be convex upward. The second water supply passage 35 as formed so far is configured to supply water which flows from the first water supply chamber 25 to a water discharge tank 31 through a water supply passage outlet 33. The water supply passage outlet 33 of the water supply passage 35 is provided at the position lower than the bottom surface of the water storage chamber 19.

In the first embodiment, while there has been described an example where the second water discharge passage 35 is configured to use a copper pipe, it can also use a pipe made of a material such as aluminum, iron or the like.

A water supply tank 29 is formed by two parts, a container portion and a lid portion, and each of them is formed with an AS resin material, which is a transparent amorphous plastic material. The container portion and the lid portion are hermetically connected by positioning a packing (not illustrated) between them to avoid water leakage. A water discharge line 26 and a full water line 38 are indicated by silkscreen on the side surface of the water supply tank 29. When water is supplied to the water discharge line 26 of the water supply tank 29, a volume of water in the water supply tank 29 becomes 100 ml, which is 10 ml more than an inner volume of the water storage chamber 19. When water is supplied to the full water line 38, a volume of water in the water supply tank 29 becomes 400 ml. The water storage chamber 19, the water supply tank 29 and the water discharge tank 31 illustrated in FIG. 3 do not show actual relative volumes, and the volume of the water storage chamber 19 is exaggerated compared to those of the water supply tank 29 and the water discharge tank 31.

In the first embodiment, while there has been described an example where the water discharge line 26 and the full water line 38 are indicated by silkscreen, it is not limited to the silkscreen. The lines can be indicated by stencil onto the water supply tank 29, or by making a concavo-convex portion on the water supply tank 29.

Figure 4:
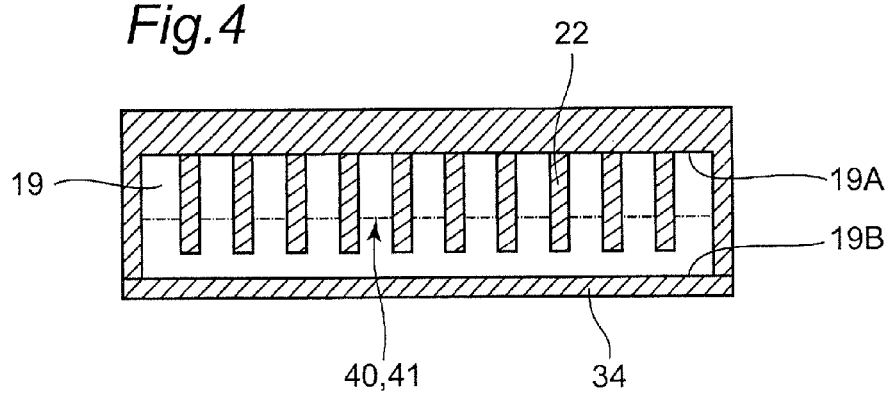
FIG. 4 is a schematic transverse cross-sectional view showing the steam generator according to the first embodiment of the present invention.

FIG. 4 is a schematic transverse section view of the steam generator 20 according to the first embodiment of the present invention.

The fins 22 extend from a first side surface 19A in the water storage chamber 19 and distal ends of the fins 22 are spaced from a second side surface 19B in the water storage chamber 19. The second side surface 19B is formed by the water storage chamber cover 34, being opposite to the first side surface. In the first embodiment, gaps between the distal ends of the fins 22 extending from the water storage chamber 19 and the water storage chamber cover 34 are 2 mm. A cross-sectional area defined by the water storage chamber 19, the fins 22 and the water storage chamber cover 34 in a plane perpendicular to the steam-generating direction (the area corresponding to a white area in FIG. 4 outlined by the water storage chamber 19, the fins 22 and the water storage chamber cover 34) is set to be equal to or larger than a cross-sectional area of the steam spout port 21.

In the first embodiment, the gaps between the distal ends of the fins 22 extending from the water storage chamber 19 and the water storage chamber cover 34 are 2 mm. The gaps may be changed to be larger or smaller than 2 mm as long as there is a space between the fins 22 and the water storage chamber cover 34, where water can enter.

Next, relating to the heating cooker including the steam generator 20 according to the first embodiment having the aforementioned configuration, operation and function thereof will be described hereinafter.

At first, when a user selects a microwave heating mode and turns on a start switch, the magnetron 6 emits microwaves. The microwaves emitted from the magnetron 6 are propagated through the waveguide 14 and directed to the rotational antenna 11. Then, microwaves are supplied to the inside of the heating chamber 1 while being stirred by the rotational antenna 11 which is being rotated by the motor 18. Some of the microwaves supplied in the heating chamber 1 are directly absorbed by the food 5 which is an object to be heated, and some of them are absorbed by the food 5 after reflected by the wall surface of the heating chamber 1, thereby heating the food 5. In such an automatic heating, mainly the infrared sensor 15 and the inside thermistor 9 detect condition of the food and condition inside the heating chamber 1, respectively, and an output or a emitting direction of the microwaves are controlled accordingly. During operation of the microwave heating mode, the mounting plate 4 has been removed from the inside of the heating chamber 1, and the food 5 is mounted on the mounting table 3 to be heated.

On the contrary, when a user selects an oven heating mode and turns on a start switch, a heating chamber heater 2 or a convection heater 8 is energized, and thus caused to generate heat for heating air, and heated air is circulated in the heating chamber 1 by the circulation fan 7, and thereby heating the food 5. Also, in such an automatic heating, mainly the infrared sensor 15 and the inside thermistor 9 detect condition of the food and condition inside the heating chamber 1, respectively, and switching between the heating chamber heater 2 and the convection heater 8 or output control are conducted accordingly.

When a user places the mounting plate 4 in the heating chamber 1, selects a grill heating mode, and turns on the start switch, microwaves are supplied to the heating chamber 1 as well as the microwave mode, and the supplied microwaves cause the heating element located at the rear side of the mounting plate 4 to generate heat. Temperature of the entire mounting plate 4 becomes high by the heat transferred from the heating element by heat conduction, and thereby heating the food 5 from the lower side.

At the same time, the microwaves flow through the space between the mounting plate 4 and the wall surface of the heating chamber 1, and thereby heating the food 5. During the grill mode, the heating chamber heater 2 is energized and thus caused to generate heat, and the food 5 is heated from upper side by radiation heat from the heating chamber heater 2. During the grill mode, it is automatically selected according to the item selected by a user whether applying radiation heat by the heating chamber heater 2 together with heat by microwaves at the same time, or selectively applying heat by microwaves or applying radiation heat by the heating chamber heater 2 independently.

In such an automatic heating, mainly the infrared sensor 15 and the inside thermistor 9 detect condition of the food and condition inside the heating chamber 1, respectively, and switching between heating by microwaves and the heating chamber heater 2 or output control are conducted accordingly.

Figure 5:
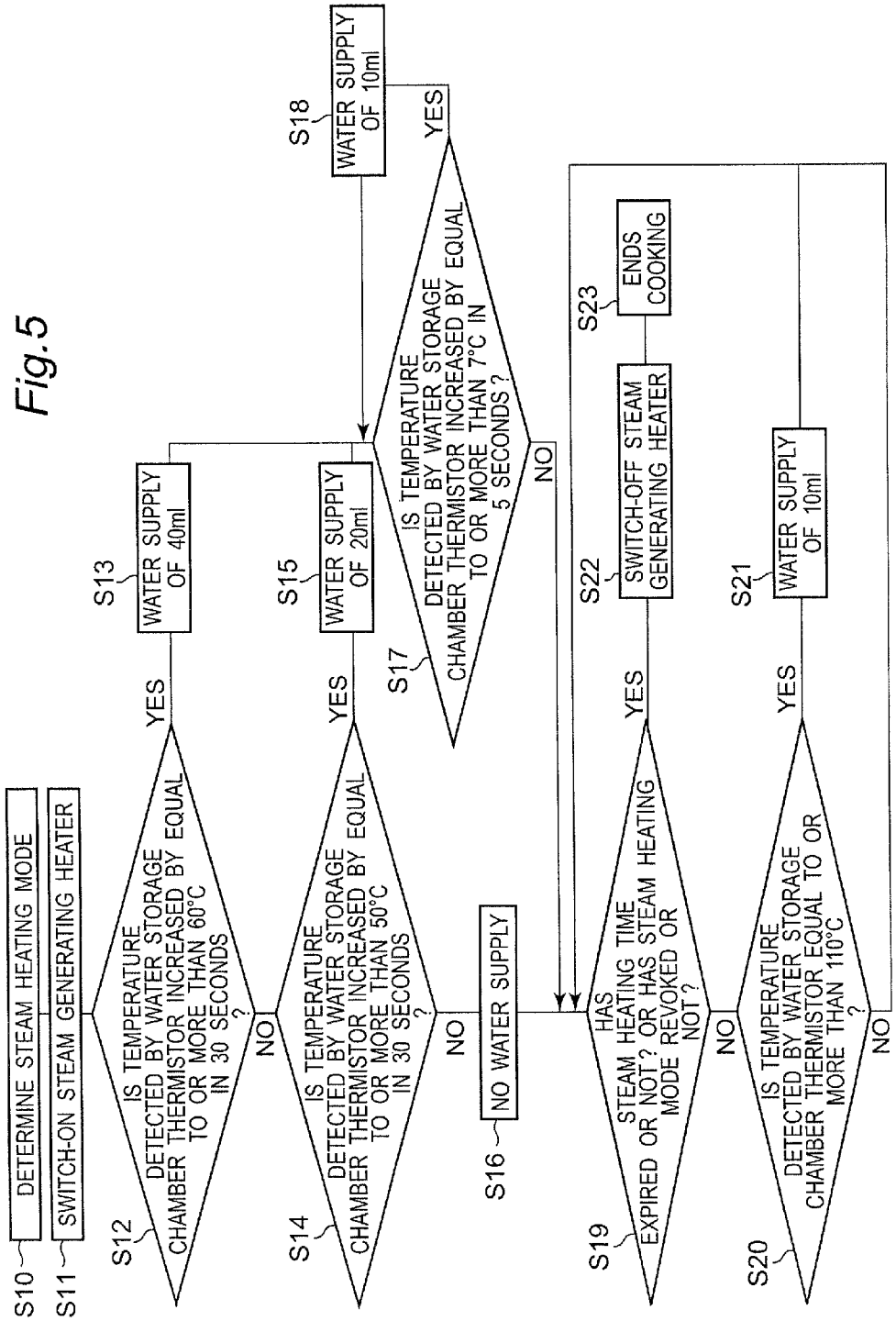
FIG. 5 is a flow chart of a steam heating mode of the steam generator according to the first embodiment of the present invention.
Figure 6:
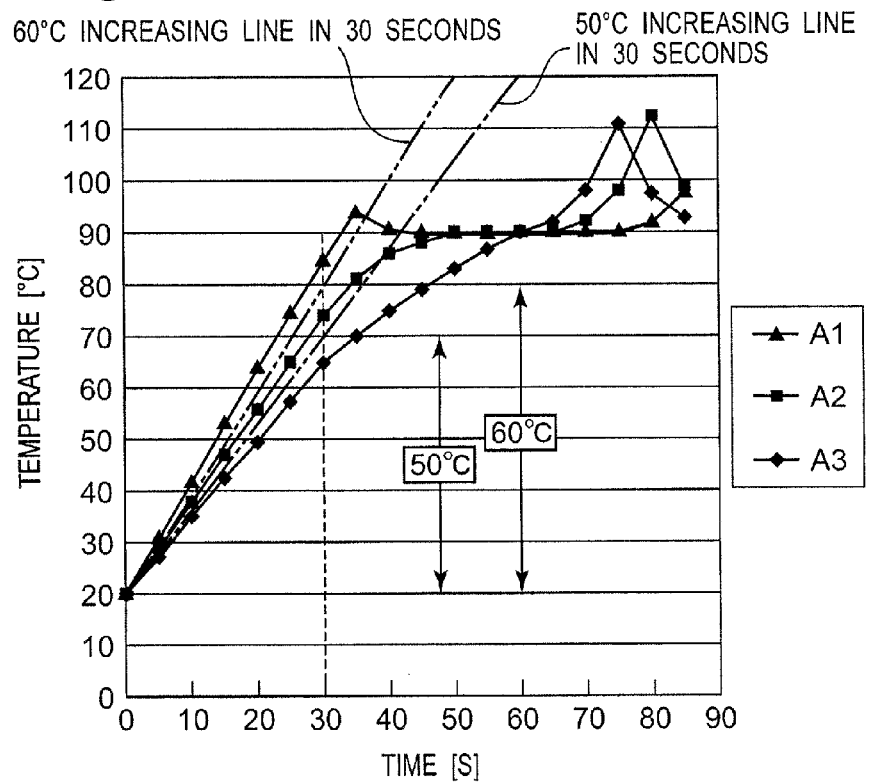
FIG. 6 is a graph showing a relationship between time and temperature of a water storage chamber thermistor of the steam generator according to the first embodiment of the present invention.

FIG. 5 shows a flow chart of a steam heating mode of the steam generator 20 of the first embodiment of the present invention. FIG. 6 is a graph showing a relationship between time and temperature of the water storage chamber thermistor provided in the steam generator 20 according to the first embodiment of the present invention.

Firstly, a user selects and determines a steam heating mode after refilling water in the water supply tank 29 to the full water line 38 (step S10). Then, the control portion 10 starts (that is, switching-ON) the first steam generating heater 40 and the second steam generating heater 41 to generate heat (step S11).

Next, as shown for line A1 in FIG. 6, when the temperature of the water storage chamber 19 detected by the water storage chamber thermistor 42 is increased by more than 60° C. in 30 seconds from the start (step S12), the control portion 10 issues a water supply instruction to the water supply pump 28 for performing a water supply of about 40 ml (step S13). The water supply by the water supply pump 28 is to supply the water in the water supply tank 29 to the water storage chamber 19 from the water supply pump 28 via the water supply passage 27 and the water supply port 36. Upon completion of supplying a predetermined amount of the water, the operation of the water supply pump 28 is stopped. On the other hand, as shown for A2 in FIG. 6, when the temperature increasing value of the water storage chamber 19 in 30 seconds exceeds 50° C. and equal to or less than 60° C. (step S14), the control portion 10 issues a water supply instruction to the water supply pump 28 for performing a water supply of about 20 ml (step S15).

As shown for A3 in FIG. 6, when the temperature increasing value of the water storage chamber 19 is less than 50° C., it is determined that the water storage chamber 19 storages a sufficient amount of the water. This will not trigger water supply (step S16).

When the water supply by the water supply pump 28 is performed in S13 and S15, the temperature increasing value of the water storage chamber 19 may exceed 7° C. in 5 seconds after the water supply (step S17). In this case, the control portion 10 issues a water supply instruction to the water supply pump 28 for performing a water supply of about 10 ml (step S18). Until the temperature increasing value of the water chamber 19 in 5 seconds after the water supply becomes less than 7° C., the water supply (S18) will be repeated.

Such a water supply to the water storage chamber 19 increases the water level to below the second steam generating heater 41 and the water is filled to contact the fins 22. Heating in this state using the first steam generating heater 40 and the second steam generating heater 41 can heat the water in the water storage chamber 19 either directly or via the fins 22, thereby evaporating the heated water to become steam. The steam generated in the water chamber 19 passes through the steam conduit passage 23 to be discharged from the steam spout port 21 into the heating chamber 1. The steam discharged into the heating chamber 1 heats the food 5.

The water storage chamber 19 and the water discharge passage 30 are communicated with each other, and therefore increasing of the water level in the water storage chamber 19 will increase the water level in the water discharge passage 30 at the same time. A water supply amount by the water supply pump 28 is adjusted so that the water level in the water storage chamber 19 does not exceed the second steam generating heater 41.

In such an automatic heating, mainly the infrared sensor 15 and the inside thermistor 9 detect condition of the food and condition inside the heating chamber 1, respectively, and switching between the first steam generating heater 40 and the second steam generating heater 41, output control, or control of the water supply pump 28 are conducted accordingly.

According to the above-mentioned control, the water in the water storage chamber 19 is evaporated in a state of stored in the water storage chamber 19, not immediately after supplied with its small amount into the water storage chamber. This makes the water in the water storage chamber 19 to be likely to remain in the water storage chamber 19, thereby suppressing scale deposition. Thus, a highly-reliable steam generator 20 can be provided.

Furthermore, in the first embodiment, the first steam generating heater 40 and the second steam generating heater 41 are disposed in a vicinity of the water surface (normal water level). This can evaporate only the water near the water surface prior to heating the water on a lower side in water chamber 19, thereby rapidly generating the steam. That is, the steam generator 20 operable to quickly generate the steam at an early stage can be provided. Further, placing the first steam generating heater 40 and the second steam generating heater 41 to cross the plurality of the fins 22 can heat the water via the fins 22, thereby achieving a uniform water heating.

In the first embodiment, the first steam generating heater 40 is arranged below the water surface while the second steam generating heater 41 is arranged above the water surface. According to such an arrangement, the first steam generating heater 40 on the lower side mainly heats the water to generate the steam, while the second steam generating heater 41 on the upper side mainly heats the generated steam or boiling water. Heating the boiling water by the second steam generating heater 41 can change the boiling water into steam, thereby preventing running-up by the boiling water. In the first embodiment, an output of the first steam generating heater 40 for mainly heating the water is set to be larger than an output of the second steam generating heater 41 for mainly heating the steam or the boiling water.

Such a setting of the outputs according to the desired heating amounts leads to efficient generation of the steam.

In the first embodiment, there has been described an example where the water is refilled to the full water line 38, but the steam heating can be conducted without refilling the water to the full water line 38.

In the first embodiment, there has been described an example where the first steam generating heater 40 and the second steam generating heater 41 are energized at the same time, but either one of the heaters may be energized alone depending on a selected cooking menu or output.

When the first steam generating heater 40 and the second steam generating heater 41 continues to do heating to generate the steam, the water levels in the water storage chamber 19 and the water discharge passage 30 are both decreased and the temperature of the water storage chamber 19 is increased.

Thereafter, it is determined whether a predetermined steam heating time has expired or not, and whether the steam heating has been revoked or not (S19). If the determination result are both NO, and the temperature detected by the water storage chamber thermistor 42 reaches equal to or more than 110° C. (S20), the control portion 10 issues a water supply instruction to the water supply pump 28 for performing an automatic water supply of about 20 ml (S21).

Performing the water supply by the water supply pump 28 in S21 will decrease the temperature of the water storage chamber 19. Water evaporation will continue after performing the water supply once, while a following water supply will not be performed until the water level is decreased and the temperature is increased. Such control can maintain the water level in the water storage chamber 19 at or above a certain level. That is, it is possible to detect the water level and perform the water supply in a simple manner without using a water level sensor.

On the other hand, the temperature increasing of the water storage chamber 19 may continue even if the water supply instruction was issued. In such a case, it is determined that the water in the water supply tank 29 has run out, or the water supply pump 28, etc. has broken down. If it is determined so, the steam heating will be stopped and the user is notified by a buzzer sound and information display to prompt water refill into the water supply tank 29 on the operational display portion 39.

Finally, if the determination result in S19 is "YES" that the steam heating time has expired or the steam heating has been revoked, the first steam generating heater 40 and the second steam generating heater 41 are stopped (S22), and the cooking ends (S23).

Thresholds for temperature increasing of the water storage chamber 19 or timings of performing the water supply used in the flow shown in FIG. 5 may be set based on amount of the water supply because the amount will change according to the outputs of the first steam generating heater 40 and the second steam generating heater 41 or the shape of the water storage chamber 19.

Figure 7A:
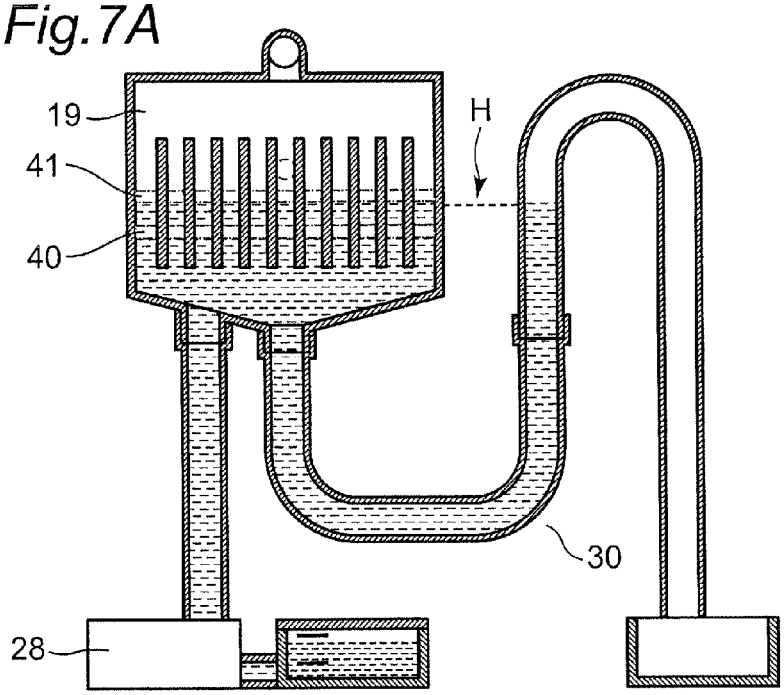
FIG. 7A is a cross-sectional view illustrating a first operation of the steam generator according to the first embodiment of the present invention during a water discharge process using the siphon principle.
Figure 7B:
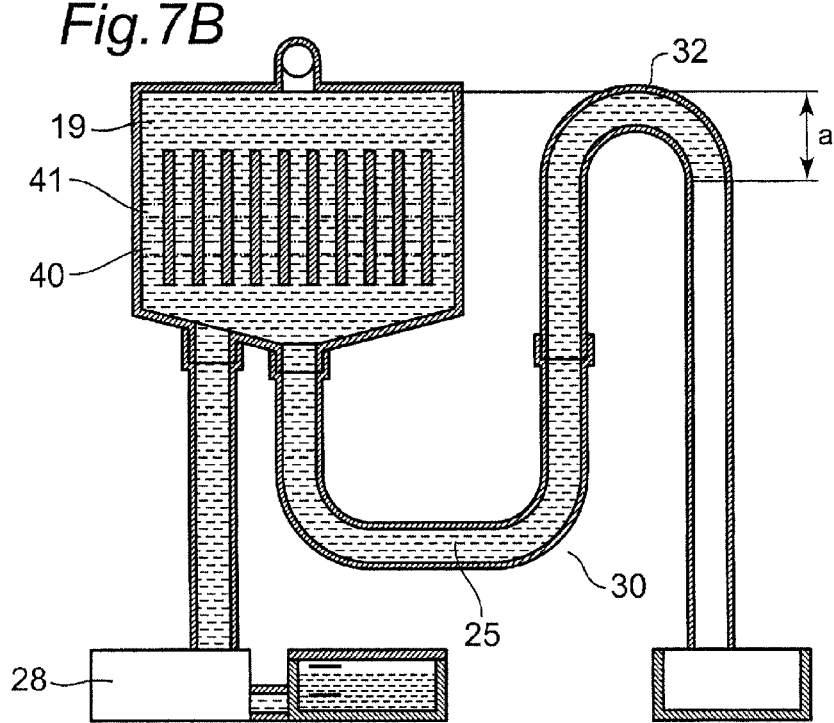
FIG. 7B is a cross-sectional view illustrating a second operation of the steam generator according to the first embodiment of the present invention during the water discharge process using the siphon principle.
Figure 7C:
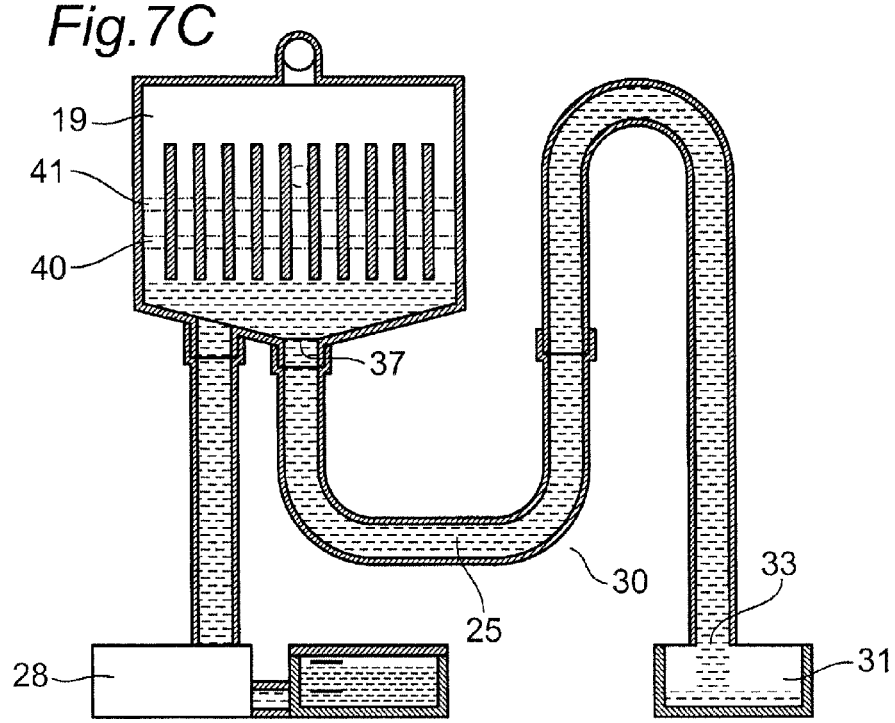
FIG. 7C is a cross-sectional view illustrating a third operation of the steam generator according to the first embodiment of the present invention during the water discharge process using the siphon principle.
Figure 7D:
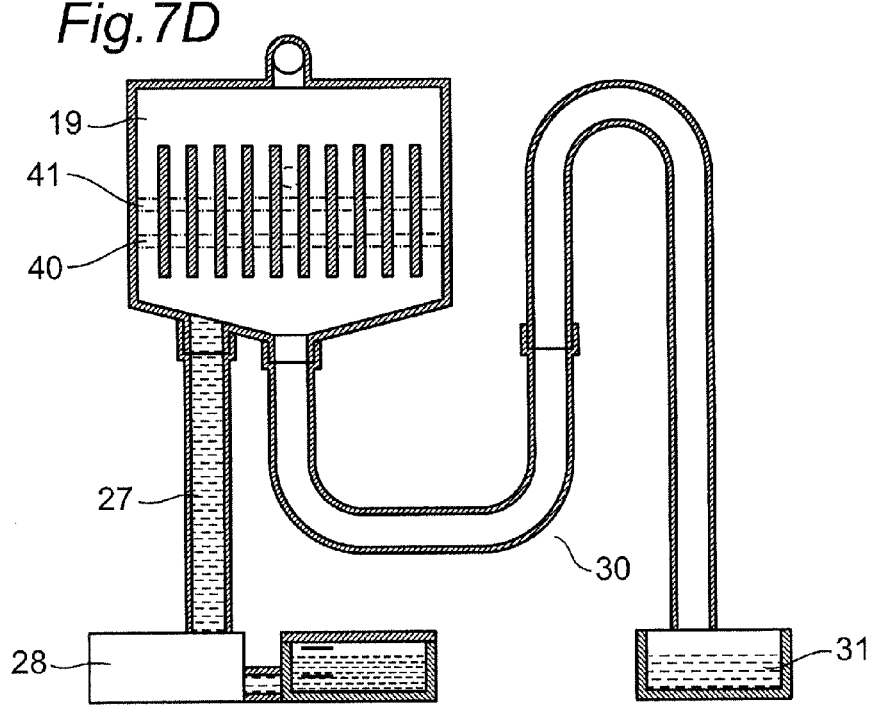
FIG. 7D is a cross-sectional view illustrating a fourth operation of the steam generator according to the first embodiment of the present invention during the water discharge process using the siphon principle.

FIG. 7A is a cross-sectional view showing a first operation of the steam generator 20 according to the first embodiment of the present invention performing a water discharge process using the siphon principle. FIG. 7B is a cross-sectional view showing a second operation of the steam generator 20 according to the first embodiment of the present invention performing the water discharge process using the siphon principle. FIG. 7C is a cross-sectional view showing a third operation of the steam generator 20 according to the first embodiment of the present invention performing the water discharge process using the siphon principle. FIG. 7D is a cross-sectional view showing a forth operation of the steam generator 20 according to the first embodiment of the present invention performing the water discharge process using the siphon principle.

As illustrated in FIG. 7A, in normal heating condition, water is filled to the level located upper than the position of the second steam generating heater 41 in the water storage chamber 19 by water supply of the water supply pump 28, and at the same time, the water level in the water discharge passage 30 is also raised. If no steam is generated in the water storage chamber 19, the water level in the water storage chamber 19 is the same as the water level in the water discharge passage 30. On the contrary, if steam is generated in the water storage chamber 19, the water level in the water storage chamber 19 is not necessarily the same as the water level in the water discharge passage 30 because pressure in the water storage chamber 19 is raised, and thereby raising the water level in the water discharge passage 30.

As illustrated in FIG. 7B, after completing the steam heating operation, water is supplied to the water storage chamber 19 by automatically driving the water supply pump 28 until the water level in the water storage chamber 19 reaches the water discharge passage upmost point 32 which is located upper than the water level in the water storage chamber 19 during the normal heating condition. If the water level is raised to the water discharge passage upmost point 32, vertical difference "a" is created between the water level in the water storage chamber 19 and the water level in the water discharge passage 30. As illustrated in FIG. 7B, if there is the vertical difference "a" between the water level in the water storage chamber 19 and the water level in the water discharge passage 30, scale cohesion water or precipitated scales in the water storage chamber 19 and the first water discharge passage 25 flows to the water discharge tank 31 through the discharge port 37, the water discharge passage 30 and the water discharge passage outlet 33 according to the siphon principle, as illustrated in FIG. 7C.

When vertical difference "a" is created between the water level in the water storage chamber 19 and the water level in the water discharge passage 30, water discharge starts. If the water supply flow rate is less than the water discharge flow rate, the water level in the water storage chamber 19 is not raised. Therefore, even if the water supply pump 28 supplies water at flow rate a little bit more than the water supply flow rate required for water discharge, water does not overflow from the water storage chamber 19. Accordingly, in the steam generator 20 according to the first embodiment, operation period for the water supply pump 28 is set such that water supply rate is a little bit more than the water supply rate required for discharging water from the water storage chamber 19 considering variation in the operation of the water supply pump 28. Therefore, a means for detecting the water level in the water storage chamber 19 during discharging water can be omitted in the steam generator 20 according to the first embodiment.

Finally, as illustrated in FIG. 7D, there is no water in the water storage chamber 19 and the water discharge passage 30, and discharged water is stored in the water discharge tank 31. The water discharge tank 31 is removed from the heating cooker by a user, and water stored in the water discharge tank 31 is disposed by the user. According to the above-mentioned water discharge operation, water in the water supply passage 27 around the water supply pump 28, which is located at upper stream side and the lower stream side relative to the water supply pump 28, is not discharged.

With adopting such a configuration of the water discharge passage 30 and performing the water supply to the water discharge passage upmost point 32, the scales deposited in the water storage chamber 19 is cleaned. Thus, only performing the water supply can perform the water discharge using the siphon principle. Therefore, scales and scale cohesion water can be discharged using a simple configuration. That is, the steam generator 20 with high reliability, low costs and reduced user's obligation can be provided.

In the steam generator 20 according to the first embodiment, while there has been described an example where water is automatically discharged at every steam heating process, a manual water discharge mode can be provided, which discharges water according to the siphon principle when a user wishes to clean up the steam generator 20.

Figure 8A:
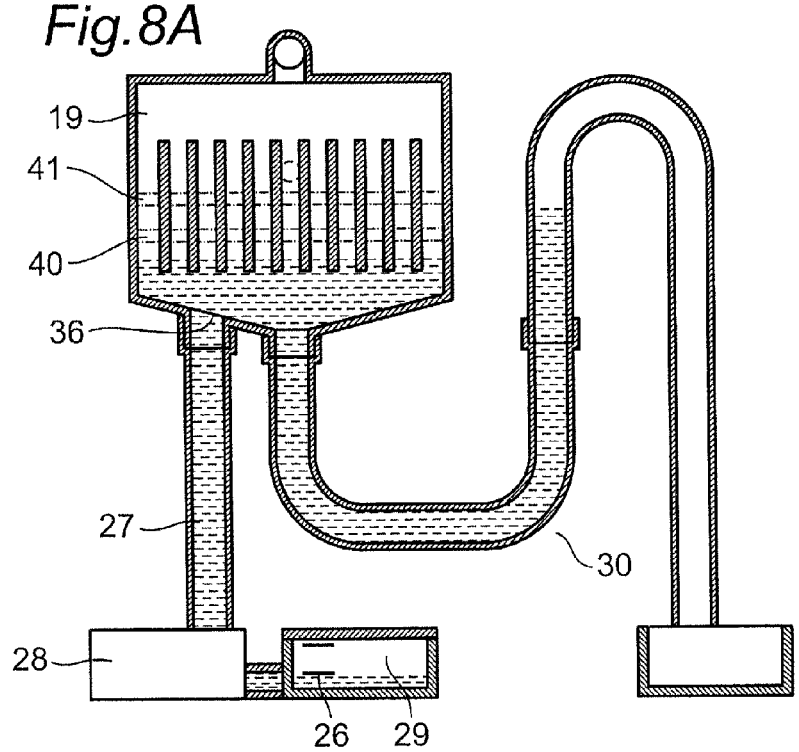
FIG. 8A is a cross-sectional view illustrating the first operation of the steam generator according to the first embodiment of the present invention during a water discharge process for a water supply passage.
Figure 8D:
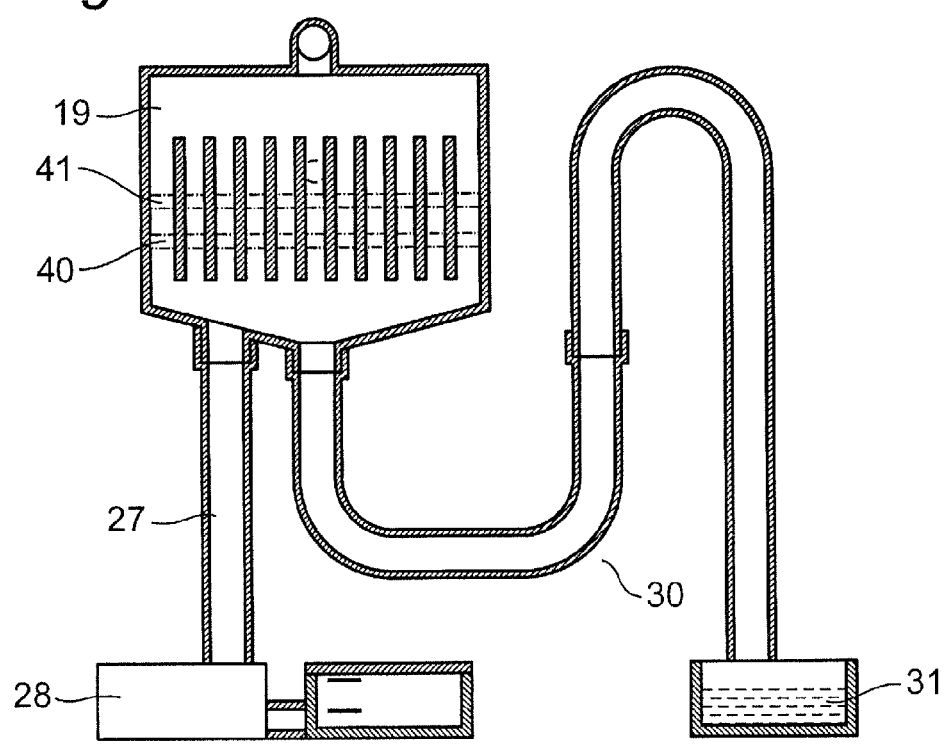
FIG. 8D is a cross-sectional view illustrating the fourth operation of the steam generator according to the first embodiment of the present invention during the water discharge process for the water supply passage.

FIG. 8A is a cross-sectional view showing a first operation of the steam generator 20 according to the first embodiment of the present invention performing a water discharge process for the water supply passage. FIG. 8B is a cross-sectional view showing a second operation of the steam generator 20 according to the first embodiment of the present invention performing the water discharge process for the water supply passage. FIG. 8C is a cross-sectional view showing a third operation of the steam generator 20 according to the first embodiment of the present invention performing the water discharge process for the water supply passage. FIG. 8D is a cross-sectional view showing a forth operation of the steam generator 20 according to the first embodiment of the present invention performing the water discharge process for the water supply passage.

When a user selects a water discharge mode and turns on a start switch after the user fills water in the water supply tank 29 up to the water discharge line 26 of the water supply tank 29, water in the water supply tank 29 is supplied to the water storage chamber 19 through the water supply passage 27 and the water supply port 36 by the water supply pump 28, as illustrated in FIG. 8A.

Further, when water is supplied continuously, the water level of the water storage chamber 19 and the water discharge passage 30 reaches the water discharge passage upmost point 32, as illustrated in FIG. 8B. Since the water supply tank 29 contains water with the volume only about 10 ml more than the volume of water which can be stored in the water storage chamber 19, there is almost no water in the water supply tank 29.

As illustrated in FIG. 8C, water is discharged to the water discharge tank 31 through the discharge port 37, the water discharge passage 30 and the water discharge passage outlet 33 according to the siphon principle. Even if water is discharged to the water discharge tank 31 as mentioned above, the water supply pump 28 operates continuously. Then, the water supply tank 29 becomes empty by the continuous operation of the water supply pump 28. Therefore, the water supply pump 28 supplies air to the water supply passage 27 instead of water. As a result, the water supply pump 28 pushes out the water in the water supply passage 27 into the water storage chamber 19 by the air, and thereby discharging water from the water discharge passage 30. Then, the water supply pump 28 stops after a predetermined period.

Finally, as illustrated in FIG. 8D, water pressed out into the water storage chamber 19 and the discharged water according to the siphon principle is merged, and the merged water is discharged toward the water discharge tank 31. Consequently, the water supply tank 29, the water supply passage 27, the water storage chamber 19 and the water discharge passage 30 become completely empty.

While the water discharge line 26 is provided in the water supply tank 29 in the steam generator 20 according to the first embodiment, it is also applicable that the indication of "10 ml" which is a required volume for discharging water, in the operational display portion 39, and thereby letting a user refill water into the water supply tank 29. If cleaning agent such as citric acid is used instead of water, it becomes easier to remove scales, water stains or the like in the water storage chamber 19. Therefore, the more clean steam generator 20 can be provided.

Thus, the water discharge by the siphon principle is performed by operating the water supply pump 28 to increase the water level to the water discharge passage upmost point 32, with the water supply tank 29 having a predetermined amount of water. Even while the water discharge by the siphon principle is being performed, the water supply pump 28 is operated to continue the water supply. According to such control, even when the water in the water tank 29 is empty, the water supply pump 28 feeds the air instead of water into the water supply passage 27, thereby pushing the residual water out of the water supply passage 27 to be discharged. The discharged water joins the water which has been discharged by the siphon principle, and both will be discharged simultaneously. Therefore, the water in the water supply passage 27 located upstream and downstream of the water supply pump 28 and the water in the water supply pump 28 can be discharged, which could not be discharged by the siphon principle. That is, the steam generator 20 which performs the water discharge at low costs can be provided.

As described above, the steam generator 20 according to the first embodiment includes: a water storage chamber 19 which stores water; at least one heating portion (for example, the first steam generating heater 40 and second steam generating heater 41) which heats water in the water storage chamber to generate steam; a water supply device (for example, the water supply pump 28) which supplies water into the water storage chamber 19; and a plurality of fins 22 provided in the water storage chamber 19, wherein the water storage chamber 19 has a steam spout port 21 from which the steam generated by the heating portion spouts, and wherein the plurality of fins 22 extend along a steam-generating direction under the steam spout port 21, being separated with each other and crossing the heating portion. Thus, the fins 22 can transmit heat in the vicinity of heating portion, with a high temperature in particular, to the inside of the water in the water storage chamber 19, to which heat is less likely to be transmitted, and also the fins 22 can increase the contact area between the water storage chamber 19 and the water, thereby transmitting the heat from the heating portion to the water efficiently. Thus, temperature of the contact portion between the water storage chamber 19 and the water decreases, and thus large bubbles which may occur at high temperature are less likely to be generated. Therefore, running-up by boiling water due to burst of the large bubbles which have risen to the water surface can be reduced, and the boiling water can be prevented from ejecting from the steam spout port 21. Also, the large bubbles are less likely to be generated, thereby reducing a burst sound of the bubbles. Also, the temperature of the contact portion between the water storage chamber 19 and the water can be decreased, thereby suppressing scale deposition, which is likely to occur at higher temperature.

In the steam generator 20 according to the first embodiment, the water storage chamber 19 is finely partitioned by the fins 22. This can reduce sizes of the bubbles during boiling physically, thereby further reducing the large bubble generation. Also, in the steam generator 20 according to the first embodiment, the fins 22 are arranged along the steam-generating direction. This leads to unstopping of the steam flow, thereby increasing steam amount and steam flow rate.

In the steam generator 20 according to the first embodiment, a cross-sectional area defined by the water storage chamber 19 and the fins 22 in a plane perpendicular to the steam-generating direction is equal to or larger than a cross-sectional area of the steam spout port 21. This leads to reduction of a cross-sectional area of a steam passage, thereby reducing pressure loss of the steam in the steam passage to suppress reduction of the steam amount. That is, while suppressing reduction of the steam amount, running-up by the boiling water can be inhibited, the boiling water can be prevented from ejecting from the steam spout port 21, and the burst sound of the babbles can be reduced.

In the steam generator 20 according to the first embodiment, the fins 22 extend from a first side surface 19A in the water storage chamber 19, and distal ends of the fins 22 are spaced from a second side surface 19B in the water storage chamber 19 opposite to the first side surface 19A. Thus, water can flow between the fins 22 and the second side surface 19B, thereby increasing the contact area between the water storage chamber 19 and the water. This facilitates water convection, thereby achieving more uniform temperature distribution of the water in the water storage chamber 19. Thus, large bubble generation can be reduced, thereby inhibiting running-up by the boiling water and thus preventing the boiling water from ejecting from the steam spout port 21. Also, it is possible to reduce burst sound of the bubbles.

In the steam generator 20 according to the first embodiment, the heating portion is provided each of above and under a water surface which emerges in the water storage chamber during heating. Thus, even when the bubbles generated during boiling burst at the water surface to run up, the heating portion arranged above the water surface heats the bubbles and changes them into steam, thereby preventing the boiling water from ejecting from the steam spout port 21.

The steam generator 20 according to the first embodiment includes: a water storage chamber 19 which stores water; a heating portion (for example, the first steam generating heater 40 or second steam generating heater 41) which heats water in the water storage chamber 19 to generate steam; and a water supply device which supplies water into the water storage chamber 19, wherein the water storage chamber 19 has an inner wall provided with a steam spout port 21 from which the steam generated by the heating portion spouts, and wherein the at least one heating portion is provided each of above and under a water surface which emerges in the water storage chamber 19 during heating. Thus, even when the bubbles generated during boiling burst at the water surface to run up, the heating portion arranged above the water surface heats the bubbles and changes them into steam, thereby preventing the boiling water from ejecting from the steam spout port 21.

The steam generator 20 according to the first embodiment includes: a water storage chamber 19 which stores water; a first steam generating heater 40 and a second steam generating heater 41 which heat water in the water storage chamber 19 to generate steam; a water supply pump 28 which supplies water via a water supply passage 27 and a water supply port 36 provided in the water storage chamber 19; a steam spout port 21 from which the steam generated in the water storage chamber 19 spouts; and a water storage chamber thermistor 42 which detects temperature of the water storage chamber 19. Moreover, after operation start, the control portion 10 starts heating of the water storage chamber 19 using the first steam generation heater 40 and the second steam generation heater 41, and determines an initial amount of the water supply depending on a temperature increasing rate of the water storage chamber 19 for a given time detected by the water chamber thermistor 42. Such a determination of the initial amount of the water supply and steam generating with use of the water stored in the water storage chamber 19 can prevent water-overflowing from the water storage chamber 19 and heating of the empty water storage chamber 19. Therefore, failure of the first steam generating heater 40 and the second steam generating heater 41 due to excessive heating, or efficiency reduction of steam generating can be prevented. That is, the steam generator 20 with high reliability and safety can be provided.

In the steam generator 20 according to the first embodiment, if the temperature increasing value of the water storage chamber 19 in 30 seconds is equal to or less than 50° C. (as shown for A3 in FIG. 6), water supply by the water supply pump 28 is not performed. On the contrary, if the temperature increasing value of the water storage chamber 19 in 30 seconds exceeds 50° C. (as shown for A2 in FIG. 6), the water supply pump 28 supplies water of about 20 ml into the water storage chamber 19. That is, if the temperature increasing value of the water storage chamber 19 in 30 seconds is equal to or less than 50° C., it is estimated that the water level in the water storage chamber 19 is high, and water supply is not performed accordingly. This can prevent water-overflowing from the water storage chamber 19. Also, if the temperature increasing value of the water storage chamber 19 in 30 seconds exceeds 50° C., it is estimated that the water level in the water storage chamber 19 is low, and a predetermined amount of water supply is performed accordingly. Thus, the temperature of the water storage chamber 19 is decreased, and heating of the empty water storage chamber 19 can be prevented. Therefore, failure of the first steam generating heater 40 and the second steam generating heater 41 due to excessive heating, or efficiency reduction of steam generating can be prevented. That is, the steam generator 20 with high reliability and safety can be provided.

In the steam generator 20 according to the first embodiment, water supply amount when the temperature increasing value of the water storage chamber 19 in 30 seconds exceeds 60° C. (as shown for A1 in FIG. 6) is set to be larger than water supply amount when the temperature increasing value of the water storage chamber 19 in 30 seconds exceeds 50° C. and is equal to or less than 60° C. (as shown for A2 in FIG. 6). That is, if the temperature increasing rate of the water storage chamber 19 is relatively high, it is estimated that the water level of the water storage chamber 19 is low, and thus a large amount of water supply is performed compared to when the temperature increasing rate is relatively low. Thus, the temperature of the water storage chamber 19 is decreased, and water-overflowing from the water storage chamber 19 can be prevented. Further, a given amount of water supply is performed, thereby preventing heating of the empty water storage chamber 19. Therefore, failure of the first steam generating heater 40 and the second steam generating heater 41 due to excessive heating, or efficiency reduction of steam generating can be prevented. That is, the steam generator 20 with high reliability and safety can be provided.

In the steam generator 20 according to the first embodiment, the water discharge passage 30 is provided to extend from the discharge port 37 in the water storage chamber 19 to upward via a level of the water surface (normal water level H shown in FIG. 3 or 7A) emerging in the water storage chamber 19 during normal heating. By increasing the water level in the water discharge passage 30 to exceed the water discharge passage upmost point 32 by the water supply with use of the water supply pump 28, the water stored in the water storage chamber 19 can be discharged by the siphon principle through the water discharge port 37 and the water discharge passage 30. Thus, if a large amount of water supply is performed even when the water level of the water storage chamber 19 is high, water discharge will not be performed until the water level in the water discharge passage 30 reaches the water discharge passage upmost point 32. Accordingly, mistaken water discharge can be prevented.

In the steam generator 20 according to the first embodiment, the first water discharge passage 25 of the water discharge passage 30 is formed by silicone, which is less likely to be joined with scales. Thus, the scales will not adhere to the first water discharge passage 25, thereby discharging the scales easily and reliably from the first water discharge passage 25 when performing the water discharge using the siphon principle. Consequently, the steam generator 20 according to the first embodiment with high reliability can be provided, whose steam generation performance is not lowered in spite of long term use.

Further, in the steam generator 20 according to the first embodiment, according to the configuration such that the first water discharge passage 25 is formed by using a non-metallic material and the second water discharge passage 35 is formed by using a metallic material in the water discharge passage 30, particularly scales are not adhered to the first water discharge passage 25 in which scales are likely to be accumulated, and the second water discharge passage 35 can be fixed easily and manufactured at low cost with configuration formed by bending a metallic pipe.

Further, according to the configuration such that the nonmetallic portion of the first water discharge passage 25 is formed by an elastic body, the discharge port 37 which connects the first water discharge passage 25 and the water storage chamber 19, and the connecting portion which connects the first discharge passage 25 and the second water discharge passage 35 can be achieved without using another parts such as a tube. Accordingly, the steam generator 20 according to the first embodiment can avoid water leakage or the like due to the increase of the number of parts, and thereby achieving the steam generator with high reliability which is manufactured at low cost.

Further, according to the configuration such that at least an inner surface of the first water discharge passage 25 of the water discharge passage 30 is coated with a nonmetallic material to form the nonmetallic coating layer, it can prevent scales from being adhered to the first water discharge passage 25 with a simple configuration, for example, even if a metallic material has to be applied to the first water discharge passage 25 with reasons of heat resistance or the like. Needless to say, if the above-mentioned coating layer is formed on an inner surface of the water discharge passage 25 formed by using a nonmetallic material, it can enhance heat resistance performance and reliability.

In the steam generator 20 according to the first embodiment, while one water storage chamber thermistor 42 is provided in the water storage chamber 19 to readily estimate the water level in the water storage chamber 19, it can adjust amount of the supplied water more accurately by providing a plurality of the water storage chamber thermistors 42 in the water storage chamber or by using a water level sensor to detect the water level in the water storage chamber 19 or the water discharge passage 30.

Further, in the steam generator 20 according to the first embodiment, there has been described an example where the water supply tank 29 and the water discharge tank 31 are formed separately, it can prevent a mistake of forgetting to set the water discharge tank 31 and prevent discharged water from dropping onto the floor by forming both tanks integrally. Further, by forming the water supply tank 29 and the water discharge tank 31 integrally, since the water discharge tank 31 is removed at the timing of refilling water in the water supply tank 29, it can prevent a mistake of forgetting to dispose the discharged water due to forgetting to remove the water discharge tank 31 as well as it can prevent the discharged water from overflowing from the water discharge tank 31 which is full of water.

Further, by providing a water discharge tank detection device which detects whether the water discharge tank 31 is set at the predetermined position or not, it can be configured such that water discharge process cannot be performed if a user forgets to set the water discharge tank 31, and thereby preventing water stored in the water discharge passage 30 from flowing out and dropping onto the floor.

In the first embodiment, since after completion of steam heating process, a water temperature in the water storage chamber 19 can be lowered at the same time when water is supplied for performing water discharge process according to the syphon principle, it can be configured such that water is actually discharged after performing natural cooling for a while until a water temperature in the water storage chamber 19 becomes a predetermined temperature or lower. This is because solubility of calcium carbonate as a kind of scales is higher if temperature is lower, and a user will not suffer from burns even if the user touches the water just discharged. It is preferable that a temperature of discharged water is lower, it takes, however, a longer time for cooling the water naturally if a temperature of the discharged water is made lower. Therefore, the temperature of the discharged water should be adequately determined considering a balance with the time for natural cooling.

The heating cooker according to the first embodiment of the present invention can perform the microwave heating mode, the oven heating mode, the grill heating mode or the steam heating mode independently, but the respective heating modes can be performed in combination manually or automatically.

A steam generator according to the present invention is applicable, as a cooking device to use steam, to various applications such as microwave ovens, oven function equipped microwave ovens, electrical ovens, rice cookers, thawing devices for business use or the like, and is a very useful device.

What is claimed is:

1. A steam generator comprising:
    a water storage chamber which stores water;
    at least one heating portion that heats water in the water storage chamber and is configured to generate steam;
    a water supply device that supplies water into the water storage chamber; and
    a plurality of fins in the water storage chamber,
    wherein the water storage chamber comprises an aluminum die cast body portion that has an opening, and a water storage chamber cover opposite to the opening,
    wherein the water storage chamber has a steam spout port from which the steam generated by the heating portion spouts, wherein the plurality of fins extend from a first surface as a part of the body portion of the water storage chamber along a steam-generating direction under the steam spout port, the plurality of fins separated from each other and crossing the heating portion, wherein distal ends of the fins are spaced from a second side surface as a part of the water storage chamber cover opposite to the first side surface of the water storage chamber, and wherein the heating portion is cast in the body portion of the water storage chamber.

2. The steam generator according to claim 1, wherein a cross-sectional area defined by the water storage chamber and the fins in a plane perpendicular to the steam-generating direction is equal to or larger than a cross-sectional area of the steam spout port.

3. The steam generator according to claim 1, wherein the at least one heating portion is provided each of above and below a water surface that emerges in the water storage chamber during heating.

4. A heating cooker including the steam generator according to claim 1.

* * * * *